United States Patent [19]

Gatti

[11] Patent Number: 4,668,177
[45] Date of Patent: May 26, 1987

[54] CORE ROD ASSEMBLY FOR INJECTION BLOW MOLDING MACHINES

[75] Inventor: Joeo M. Gatti, Batavia, Ohio

[73] Assignee: Owens-Illinois, Inc., Toledo, Ohio

[21] Appl. No.: 789,211

[22] Filed: Oct. 18, 1985

[51] Int. Cl.⁴ .............................................. B29C 49/06
[52] U.S. Cl. ................................... 425/529; 264/537; 264/538; 425/534; 425/535
[58] Field of Search ............... 425/522, 526, 534, 537, 425/547, 529, 535; 264/537, 538

[56] References Cited

U.S. PATENT DOCUMENTS 4,063,867 12/1977 Janniere .............................. 425/534

Primary Examiner—Jay H. Woo
Assistant Examiner—Timothy W. Heitbrink
Attorney, Agent, or Firm—Philip M. Rice

[57] ABSTRACT

A core rod assembly for injection blow molding machines comprising a plurality of hollow core rods each of which has a closed end and an open end which is threaded on a core rod spool that is telescopically received in a core rod body such that the core rod and core rod spool has limited longitudinal movement relative to the core rod body for the purpose of permitting blow air to be provided for blowing a parison on the core rod. A tube extends through an opening in each core rod spool and the opening core rod and the spool has laterally extending passages communicating with the exterior of the spool. The passages are connected to spaced passages of a manifold by bellows type adaptors such that temperature control fluid such as liquid or air can be circulated through the tube and thereafter about the tube to cool the core rod. The bellows type adaptors provide a seal which accommodates the limited longitudinal movement between the spool and the body without the need for dynamic seals or bulky hoses so that a greater number of molds may be utilized in side by side relation.

12 Claims, 6 Drawing Figures

CORE ROD ASSEMBLY FOR INJECTION BLOW MOLDING MACHINES

This invention relates to injection blow molding machines and particularly to core rods for such injection blow molding machines.

BACKGROUND AND SUMMARY OF THE INVENTION

In injection blow molding machines it is well known to provide a core rod that is inserted successively into an injection mold to form a preform or parison and is thereafter used to transfer the parison to a blow mold where the parison is blown outwardly against the confines of the mold to form the hollow article.

One type of injection blow molding machine includes a turret that has three surfaces, each of which supports a plurality of longitudinally spaced core rod assemblies. When the turret is rotated, the core rod assemblies are moved successively first to a station having an array of parison molds where the parisons are injection molded on the core rod assemblies, then to another station having an array of blow molds where the parisons are blown to form the hollow articles and finally to a station where the hollow articles are removed from the parisons permitting a new cycle to begin.

In such a machine it is necessary that the core rod have some limited longitudinal movement with respect to its support. Inasmuch as the core rod must be cooled by circulating coolant within the core rod, provision must be made for directing the coolant from a manifold to the core rod and returning the coolant to the manifold. In order to accommodate the longitudinal movement dynamic seals have been heretofore utilized, but these are subject to leakage and necessitate continuous maintenance.

Among the objectives of the present invention are to provide a core rod assembly which obviates the aforementioned problems; which is relatively simple; and which obviates the need for sliding parts or dynamic seals.

In accordance with the invention, the core rod assembly for injection blow molding machines comprises a plurality of hollow core rods each of which has a closed end and an open end which is threaded on a core rod spool that is telescopically received in a core rod body such that the core rod and core rod spool has limited longitudinal movement relative to the core rod body for the purpose of permitting blow air to be provided for blowing a parison on the core rod. A tube extends through an opening in each core rod spool and the opening core rod and the spool has laterally extending passages communicating with the exterior of the spool. The passages are connected to spaced passages of a manifold by bellows type adaptors such that temperature control fluid such as liquid or air can be circulated through the tube and thereafter about the tube to cool the core rod. The bellows type adaptors provide a seal which accommodates the limited longitudinal movement between the spool and the body without the need for dynamic seals or bulky hoses so that a greater number of molds may be utilized in side by side relation.

DESCRIPTION

Figure 1:
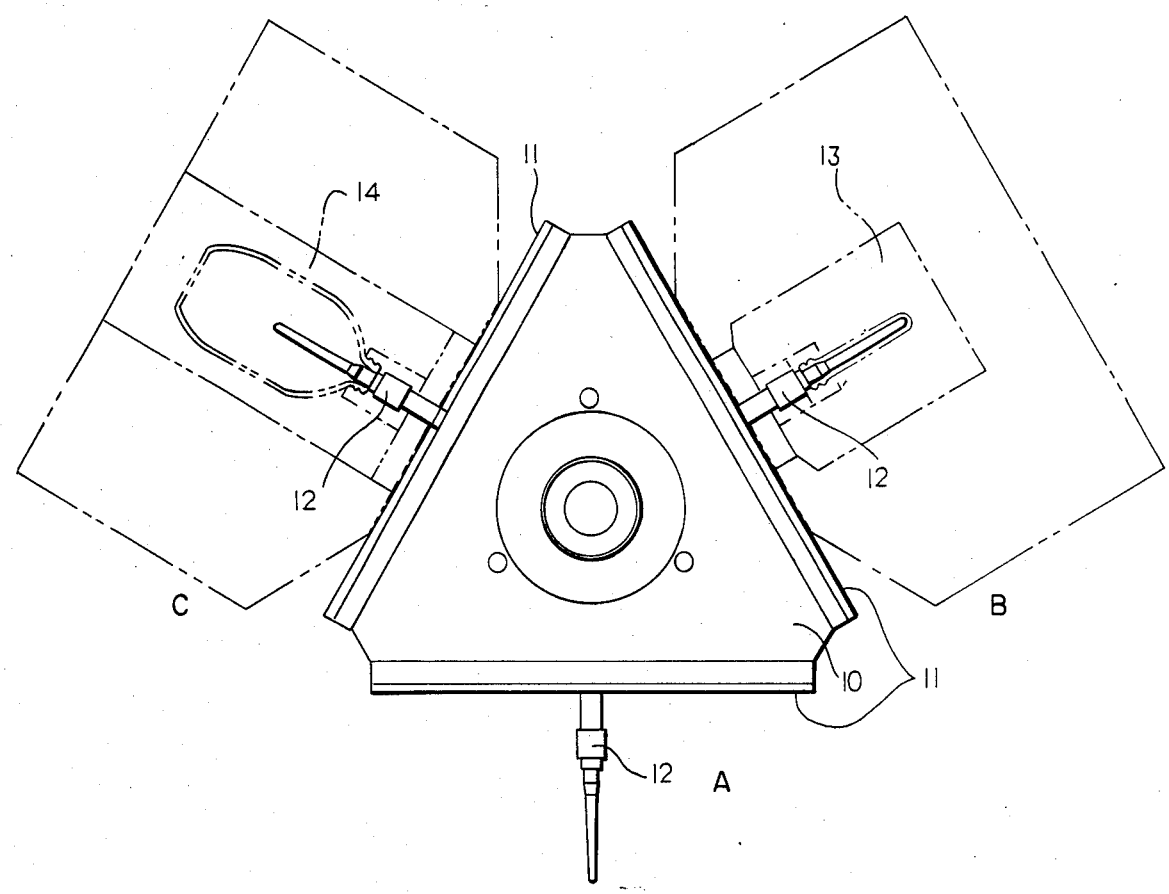
FIG. 1 is a partly diagrammatic plan view of a portion of an injection blow molding machine embodying the invention.

Referring to FIG. 1, the core rod assembly which is the subject of the present invention is adapted to be used in the manner, for example, wherein the injection blow molding machine includes a turret 10 that has three surfaces 11, each of which supports a plurality of longitudinally spaced core rod assemblies 12. When the turret is rotated in a counter clockwise direction, the core rod assemblies are moved successively first to a station A having an array of parison molds 13 where the parisons are injection molded, then to a station B having an array of blow molds where the parisons are blown to form the hollow articles, and finally to a station C where the hollow articles are removed from the parisons permitting a new cycle to begin.

Figure 2:
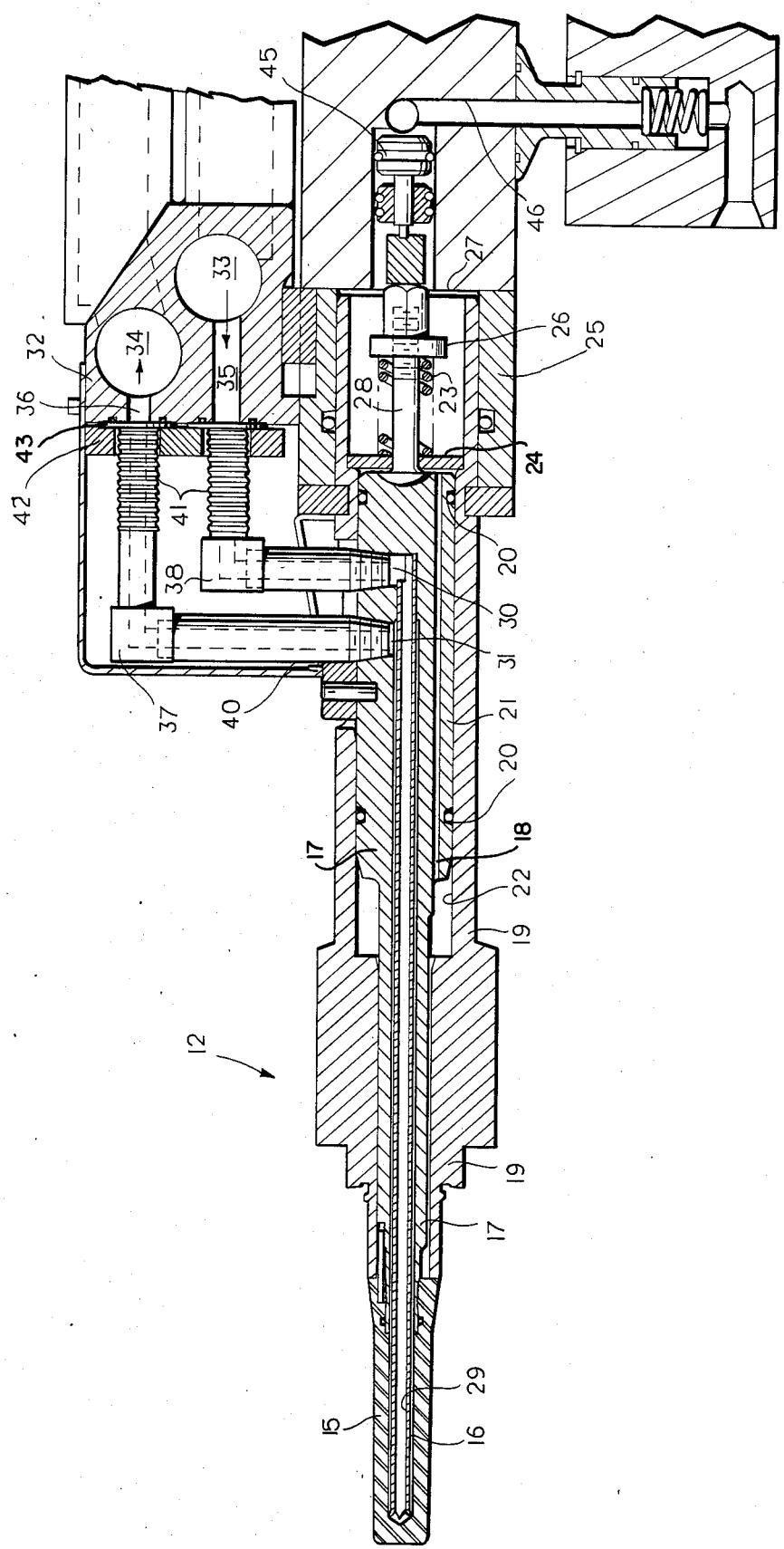
FIG. 2 is a longitudinal sectional view of the core rod assembly embodying the invention.
Figure 3:
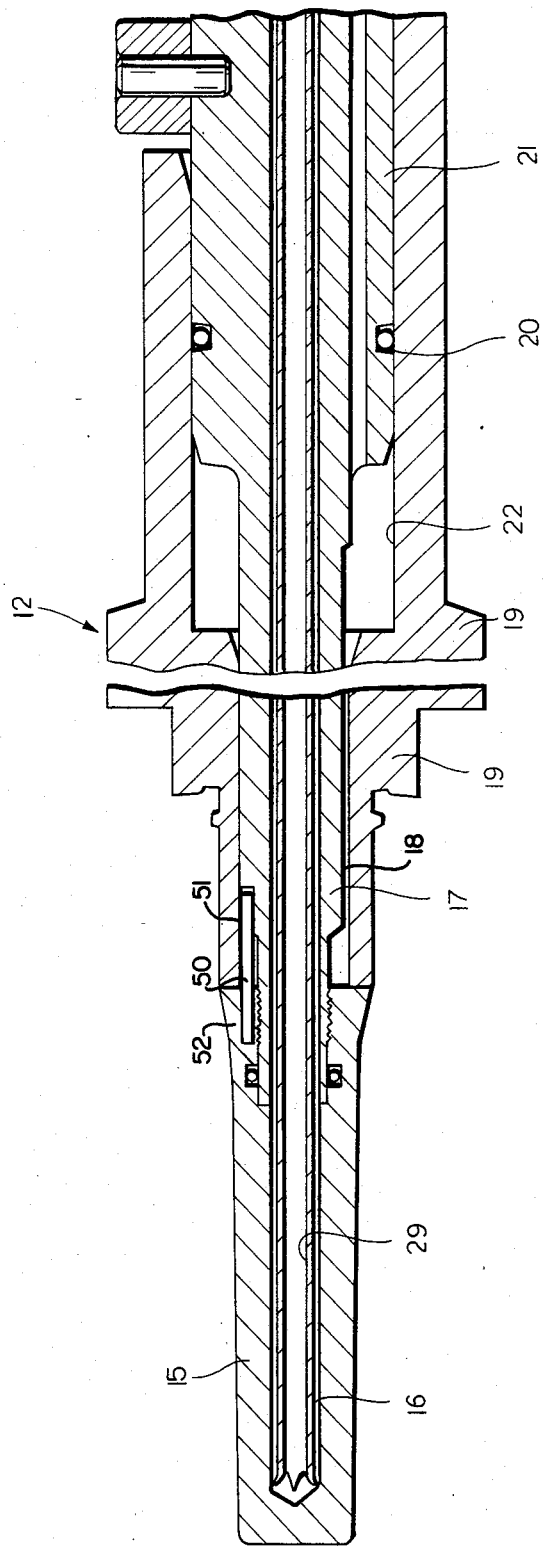
FIG. 3 is a fragmentary enlarged sectional view of a portion of the core rod shown in the left in FIG. 2.
Figure 3A:
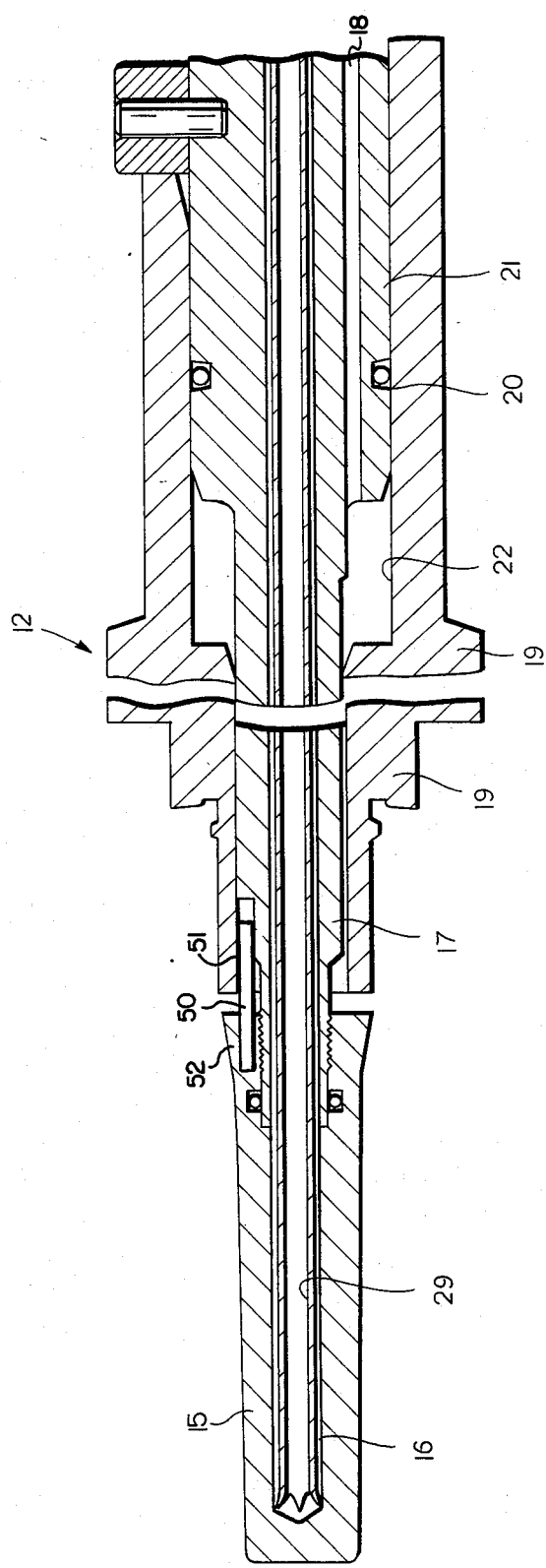
FIG. 3A is a view similar to FIG. 3 showing the parts in a different operative position.
Figure 4:
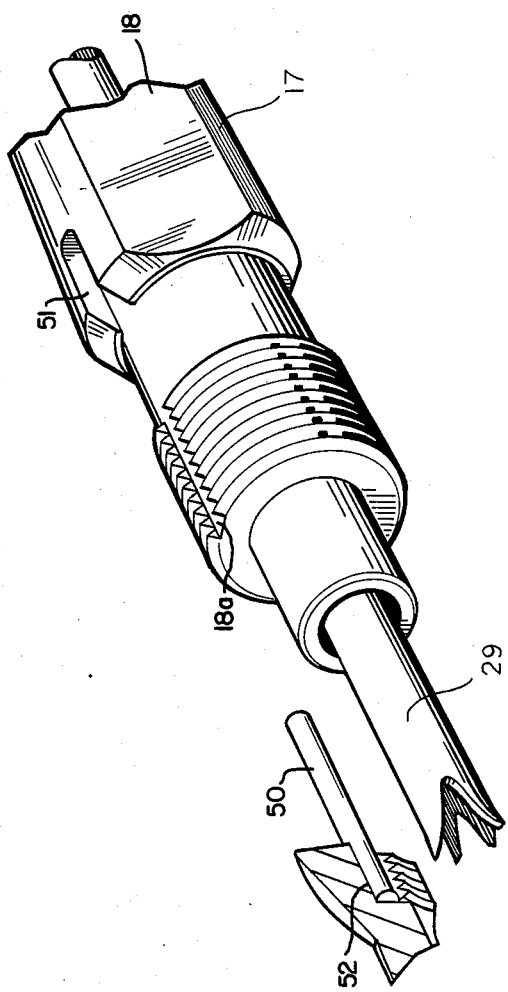
FIG. 4 is a fragmentary perspective view of a portion of the core rod assembly.
Figure 5:
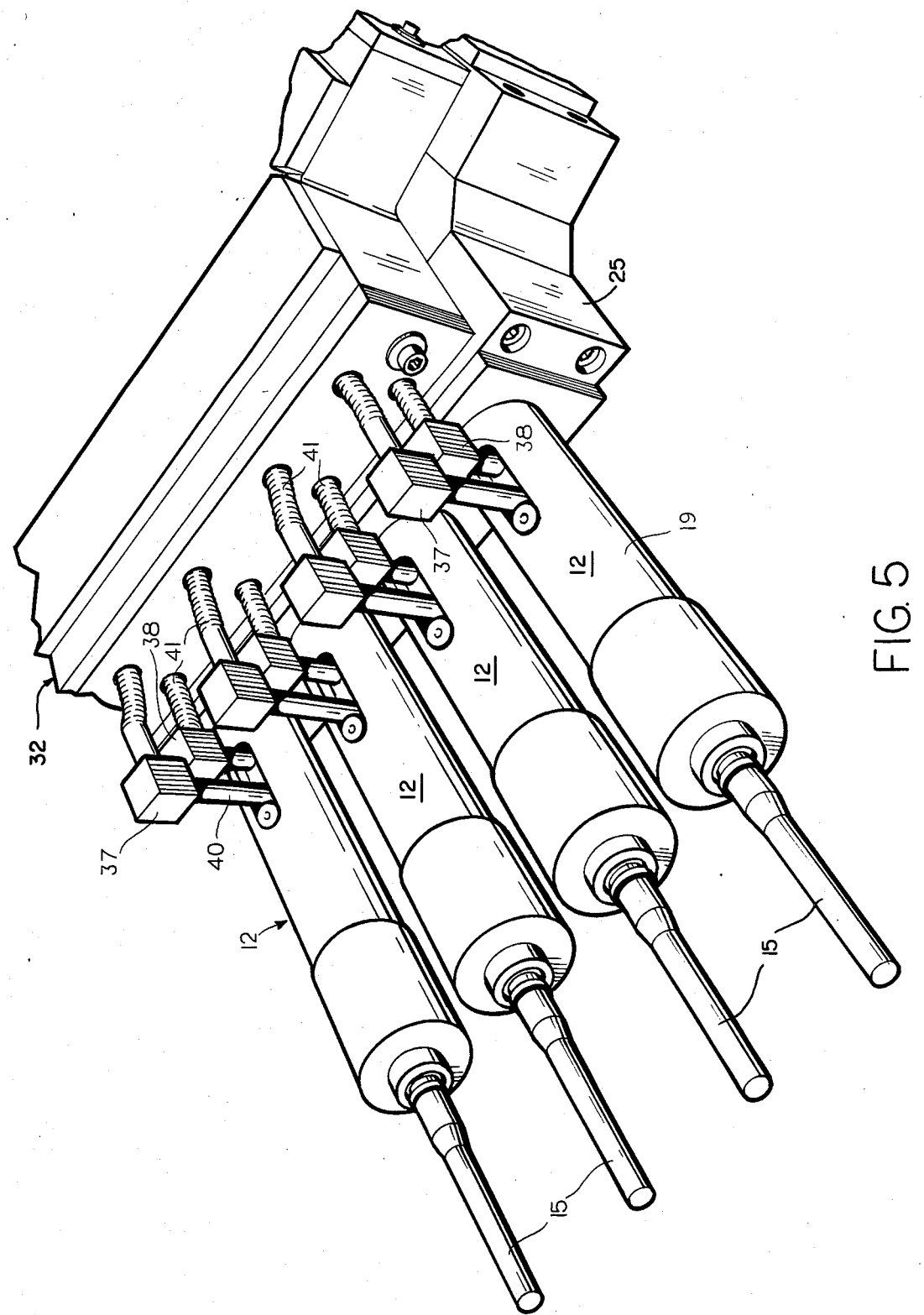
FIG. 5 is a fragmentary perspective view of a portion of the apparatus showing a plurality of core rod assemblies.

Referring to FIGS. 2 and 3, the core rod assemblies on each surface 11 are mounted on a manifold, as presently described. Each core rod assembly 12 comprises a core rod 15 having an external configuration corresponding to the internal configuration of the parison and a hollow opening 16 which is closed at the outer end of the core rod and open at the inner end. The core rod 15 is threadedly mounted on a core rod spool 17 which also has a longitudinally extending opening 18 that opens to communicate with the opening 16 in the core rod 15. The spool 17 is mounted in a core rod body 19 that abuts the inner end of the core rod 15. O-rings 20 on an enlarged portion 21 of the core rod spool 17 provide a seal with a cavity 22 in the body 19. The space 16, in turn, communicates with the exterior through a slot 18a in the threaded connection between the core rod spool 17 and the core rod 15. When the core rod 15 is shifted to the left, blow pressure flows through passages 18, 18a to the space between the core rod 15 and core rod body 19 into the interior of the parison to blow the parison (FIGS. 3A, 4). A pin 50 extends into aligned slots 51, 52 in the core rod spool 17 and core rod 15, respectively.

A spring 23 yieldingly urges the core rod spool 17 to the left as viewed in FIG. 2, the spring 23 being interposed between a wall 24 of a core rod support 25 and a threaded star nut 26 on a nut 27 which is threaded on an extension 28 of the core rod spool 17. A tube 29 extends longitudinally through the openings of the core rod spool and core rod and has its end cut away such that portions thereof are spaced from the closed end of the core rod 15 and the inner end of the core rod spool 17, respectively.

The core rod spool 17 has transverse passages 30, 31, one of which communicates with the interior of the tube 29 and the other of which communicates with the exterior of the tube 29. A coolant manifold 32 is provided on each surface 11, the turret 10 and is fixed relative to the core rod supports 25. The manifold 32 includes longitudinally extending inlet and outlet passages 34, 33, respectively, each of which has longitudinally spaced radial passages 35, 36 extending to the exterior to define outlet and inlet passages.

A bellows type adaptor 37, 38 is provided for communicating the outlet and inlet passages 34, 33 with the inlet and outlet passages 30, 31 of the spool. More specifically, each adaptor 37, 38 comprises a fitment 40 threaded into the respective passage 30, 31 of the core rod spool 17 and defining a communicating passage at a right angle and a bellows 41 that is connected to the passages 35, 36. The bellows 41 is preferably made of metal such as electroformed nickel and the connection to the respective passages 35, 36 is made by a retainer plate 42 that holds a flanged portion 43 of the bellows in position.

The movement of the core rod 15 is achieved by a piston 45 that is operated on by pneumatic pressure through a passage 46 to shift the core rod 15 to the left as viewed in FIGS. 2, 3 and 3A providing the space, as shown in FIG. 3A for the blowing air to pass to the exterior of the core rod for blowing the parison within the blow mold.

By the above arrangement, coolant can be supplied as required even though there must be necessary longitudinal movement between the core rod 15 and the core rod body 19 as shown in FIG. 3A.

I claim:

1. A core rod assembly comprising
a hollow core rod,
a core rod spool on which said hollow core rod is mounted,
said hollow core rod and said core rod spool having communicating longitudinally extending openings,
a core rod body in which said spool is telescopically received and movable with respect to said core rod body,
a tube extending in said opening in said core rod and said opening in said core rod spool,
said core rod body including spaced transverse inlet and outlet passages providing communication to the interior of the tube and the exterior of the tube respectively,
a fixed coolant manifold,
said manifold having a coolant outlet passage and a coolant inlet passage,
and bellows type adaptors providing communication respectively between the outlet and inlet passages of said manifold and the inlet and outlet passages of said core rod spool,
each said bellow type adaptor including a fitment fixed on said core rod spool and communicating with a respective passage in said core rod spool and a bellows between each said adaptor and each respective passage in said manifold, such that as said core rod spool is moved longitudinally relative to said core rod body and the manifold, fitments are moved with said core rod spool and core rod body and said bellows accommodate for the relative longitudinal movement therebetween.

2. The core rod assembly set forth in claim 1 wherein each said bellows extend parallel to a longitudinal axis of the core rod spool and core rod.

3. The core rod assembly set forth in claim 2 wherein said bellows are made of metal.

4. The core rod assembly set forth in claim 3 wherein said bellows are made of nickel.

5. The core rod assembly set forth in claim 1 including seal means between said core rod spool and said core rod body.

6. An injection blow molding machine wherein a turret has a plurality of circumferentially spaced surfaces, on each of said spaced surfaces a plurality of longitudinally spaced core rod assemblies are provided and the turret is rotated moving the core rod assemblies first to a mold station where parisons are injection molded, then to an array of blow molds where the parisons are blown to form the hollow articles and finally to a station where the hollow articles are removed from the parisons permitting a new cycle to begin, each of said core rod assemblies comprising
a hollow core rod,
a core rod spool on which said hollow core rod is mounted,
said hollow core rod and said core rod spool having communicating longitudinally extending openings,
a core rod body in which said spool is telescopically received and movable with respect to said core rod body,
a tube extending in said opening in said core rod and said opening in said core rod spool,
said core rod body including spaced transverse inlet and outlet passages providing communication to the interior of the tube and the exterior of the tube respectively,
a fixed coolant manifold,
said manifold having a coolant outlet passage and a coolant inlet passage,
and bellows type adaptors providing communication respectively between the outlet and inlet passages of said manifold and the inlet and outlet passages of said core rod spool,
each said bellow type adaptor including a fitment fixed on said core rod spool and communicating with a respective passage in said core rod spool and a bellows between each said adaptor and each respective passage in said manifold, such that as said core rod spool is moved longitudinally relative to said core rod body and the manifold, fitments are moved with said core rod spool and core rod body and said bellows accommodate for the relative longitudinal movement therebetween.

7. The injection blow molding machine set forth in claim 6 wherein said bellows extend parallel to a longitudinal axis of the core rod spool and core rod.

8. The injection blow molding machine set forth in claim 7 wherein said bellows are made of metal.

9. The injection blow molding machine set forth in claim 8 wherein said bellows are made of nickel.

10. The injection blow molding machine set forth in claim 6 including seal means between said core rod spool and said core rod body.

11. The core rod assembly set forth in claim 1 wherein said core rod assembly includes a passage extending longitudinally on said core rod spool communicating with the exterior of said tube, said passage being adapted to communicate with a source of blow fluid pressure when the core rod spool is moved longitudinally thereby moving the core rod relative to the core rod body.

12. The injection blow molding machine set forth in claim 7 wherein each said core rod assembly includes a passage extending longitudinally on said core rod spool communicating with the exterior of said tube, said passage being adapted to communicate with a source of blow fluid pressure when the core rod spool is moved longitudinally thereby moving the core rod relative to the core rod body.

* * * * *